Dec. 14, 1926.  
W. GOURLAY  
SEED PLANTER  
Filed Nov. 24, 1924  
1,610,767  
2 Sheets-Sheet 2
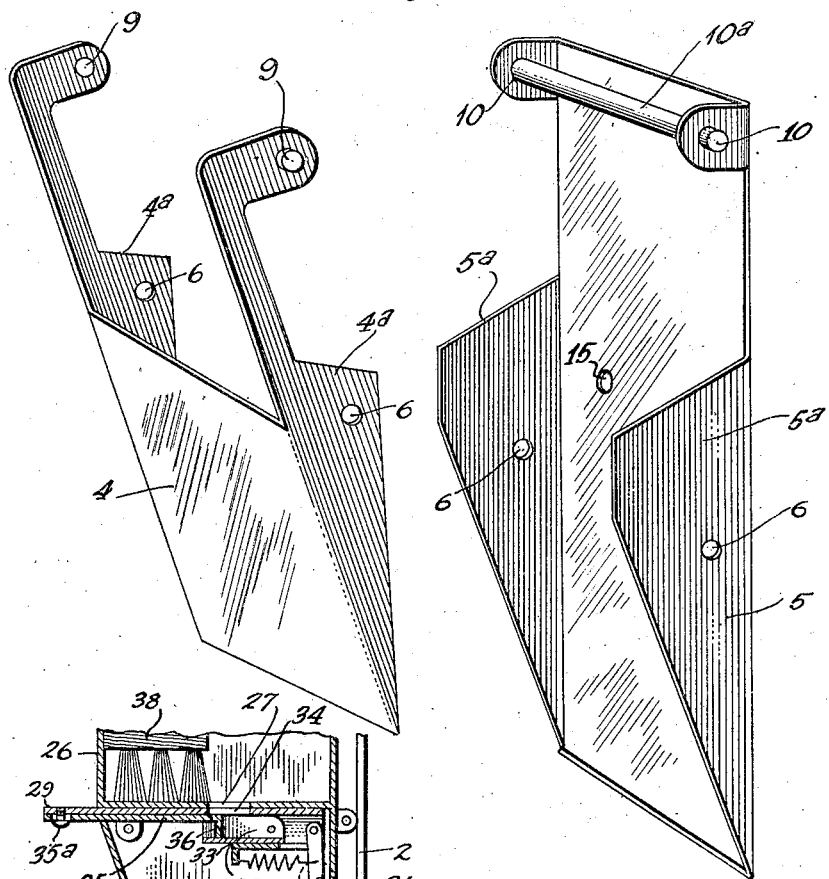
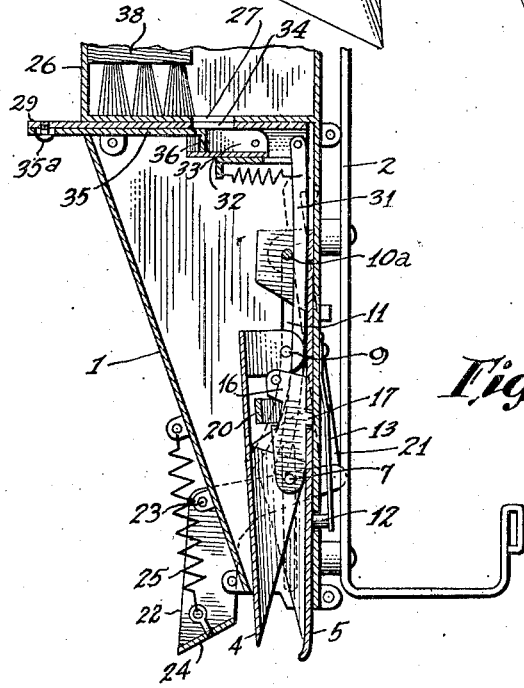
INVENTOR.  
William Gourlay  
BY Jas. H. Griffin  
ATTORNEYS.

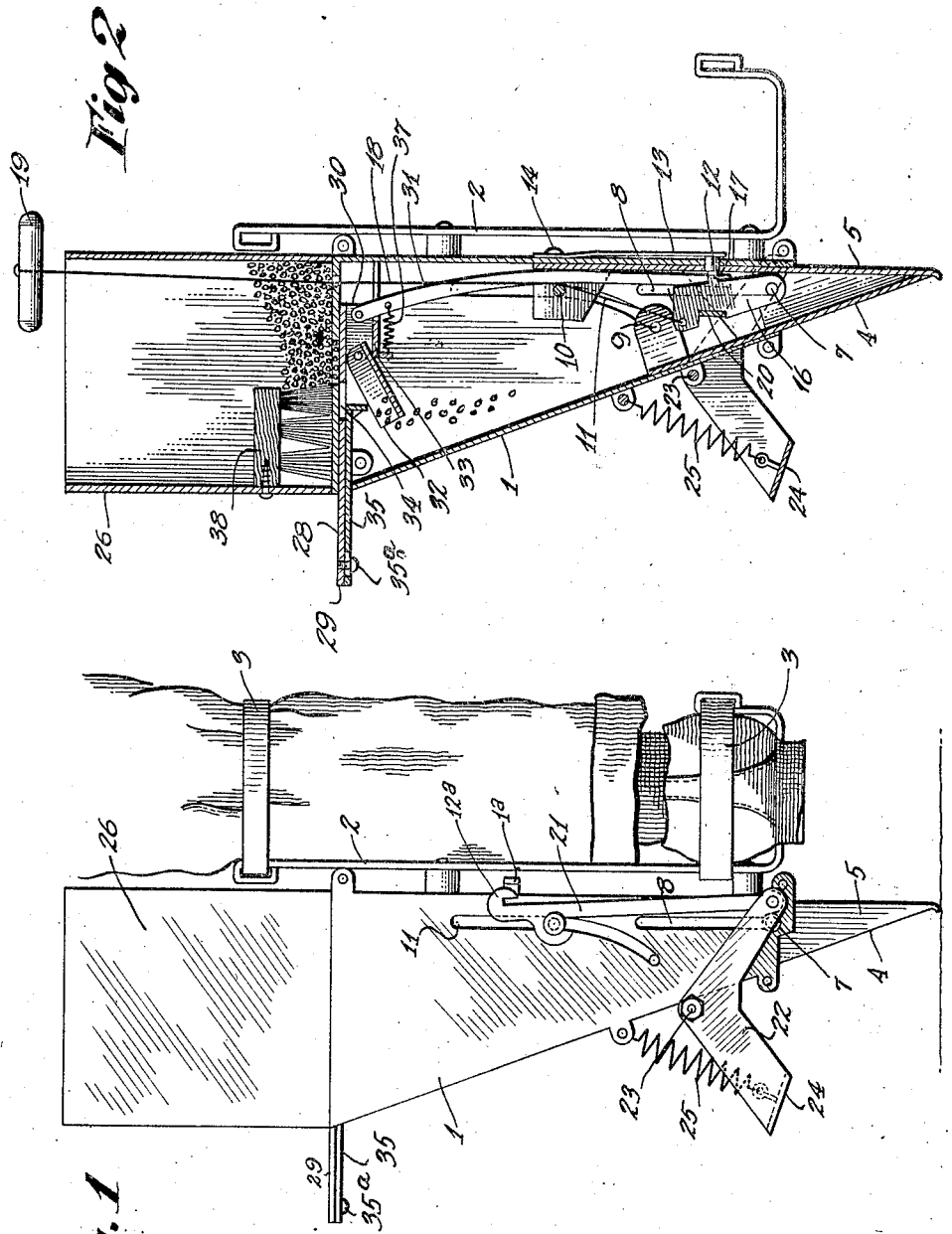

Patented Dec. 14, 1926.

1,610,767

UNITED STATES PATENT OFFICE.

WILLIAM GOURLAY, OF NEW YORK, N. Y.

SEED PLANTER.

Application filed November 24, 1924. Serial No. 751,736.

This invention is a planter for seeds and is particularly intended for the planting of corn. The object of the invention is to provide a seeder that can be clamped to the leg of a farmer and which is so constituted that as the farmer walks along a row and his weight is brought to bear upon the device at every other step, the device will function to deposit a predetermined number of seeds below the surface of the ground and will thereupon cover said seeds, so that further attention in the planting of the seeds by the farmer is not required.

The apparatus of the present invention embodies many novel features calculated to expedite planting and eliminate much of the tiresome work incident thereto under present methods. Among these novel features, though not the exclusive ones, may be mentioned the following.

First, a corn planter comprising a substantially wedge shaped construction embodying cooperating hinged jaws adapted to be forced by the weight of the farmer into the ground for a depth appropriate to good planting, and which jaws are adapted, after reaching the desired depth, to be manually opened to allow of the depositing of seeds into the ground cavity thus formed.

Second, automatic means associated with an apparatus of this character and constructed to automatically fill in the cavity and cover the seeds as the jaws are removed when the operator takes the next step.

Third, novel and efficient means for successively feeding a predetermined number of seeds or corn kernels from a suitable hopper or container to the jaws for each operation of the planter.

Fourth, means to immediately notify the operator in the event the planter fails to properly deposit the seeds whereby the operator will not continue to operate the planter while it fails to function.

Fifth, means for manually controlling the depositing of the seeds through a control of the opening of the jaws which are preferably locked in closed position until such time as it is desired to release the seeds.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is an elevation showing the planter in operative position on the leg of an operator.

Figure 2 is a vertical section illustrating the parts as shown in Figure 1, i. e., in non-planting position.

Figure 3 is a view similar to Figure 2, but showing the parts in planting position; and, Figure 4 shows the planting jaws in perspective.

Referring to the drawings, 1 designates a sheet metal casing which is substantially wedge shape and is provided with an open bottom. At one side of the casing is rigidly attached a stirrup 2 with which straps 3 are associated in order that the casing may be firmly strapped to the leg as shown in Figure 1. Operable within the casing and normally projecting through the open bottom thereof are two jaws 4 and 5 which are shown best in Figure 4 of the drawings. These jaws are preferably constructed of sheet metal and at their lateral edges have bent up wings $4^a$ and $5^a$, respectively, which constitute the sides of the jaws. The wings $4^a$ and $5^a$ are perforated as shown at 6 and a rod 7 extends through these perforations and through slots 8, which extend vertically in the opposite sides of the casing. This rod serves as a pivot for the two jaws and simultaneously mounts the jaws for pivotal and sliding movement within the casing.

Adjacent the top of the jaw 4 are laterally extending pins or trunnions 9 and similar pins or trunnions 10 are formed at the top of the jaw 5, all of these pins or trunnions being adapted to work in slots 11 formed in the side wall of the casing. As shown, the slots 11 extend generally in a vertical direction, but substantially the lower half of the said slots are curved out of the vertical so that when the jaws are reciprocated vertically with respect to the casing, the shaping of the slots 11 which coact with the trunnions 9 and 10 will cause the jaws to be automatically opened and closed. That is to say, when the jaws are moved upwardly into the casing, the trunnions 9 and 10 will occupy the vertical portions of the slots 11, as shown in Figure 3 with the result that the jaws will be opened as shown in this figure. When the jaws descend to their lowermost positions, as shown in Figures 1 and 2, the trunnions 9 will traverse the curved portions of the slots 11 and seat at the lower ends thereof while the trunnions 10 will remain in the vertical portions of said slots. As a result, the trunnions 9 and 10 are no longer in vertical alinement and the jaws are closed as shown best in Figure 2.

The jaws are normally locked in their lowermost position by means of a stud 12 carried by a leaf spring 13. The leaf spring is mounted on the outside of the casing and held in place thereon by a rivet 14 and normally impels the stud 12 in an inward direction through a hole in the casing. When the jaws are in lowermost position, the hole 15 in the jaw 5 registers with said hole in the casing and the leaf spring forces the stud through the registering holes and the stud serves to lock the jaws against movement. They may however be unlocked by an unlocking member 16, which is shown in the form of a latch pivoted on the rod 7 and having a finger 17, which, when the latch is swung by a pull on the cable 18 engages the end of the stud 12 as shown in Figure 2. The cable 18 extends upwardly through the top of the casing and is provided with a handle 19 by which it may be manually operated.

A stop 20 is mounted on the jaw 5 and is in the form of an angle which reaches around behind the latch and limits its backward movement. Under normal conditions, the latch will gravitate into engagement with the stop 20, as shown in Figure 2, but when the cable is pulled, the latch is forced against the stud to unlock the jaws and permit them to be elevated.

The trunnions 10 are shown in Figure 4 as formed on the end of a pin 10ª which extends across the jaw 5 and these trunnions project well beyond the exterior wall of the casing and are adapted to cooperate with the hook shaped link 21, one of which is positioned at each of the lateral faces of the casing. The lower end of each link is pivotally secured to a bell crank 22 and these bell cranks are pivoted at their elbow on a rod 23 which is fixed with respect to the casing. The free ends of the bell cranks are connected by a bridge piece 24, which joins both bell cranks so that they constitute collectively a compound bell crank. A spring 25 is connected at one end of the bridge and at the other end of the casing and serves to normally draw the compound bell crank into the position shown in Figures 1 and 2. The parts are so proportioned, however, that when the jaws are raised, the links 21 will be drawn upwardly by the trunnions 10 for the purpose of moving the compound bell crank into the position shown in Figure 3.

Mounted on the top of the casing in any suitable manner is a hopper or seed holder 26 in which a quantity of corn or other seed to be planted is contained. In the bottom of this hopper which may, in practice, be the top wall of the casing, is a hole or opening 27 and operable directly below this opening is a slide 28. The slide is in the form of a plate 29, the inner end of which is provided at its lateral edges with two turned down wings 30. To these wings is pivoted the upper end of a shifting bar 31, which is curved longitudinally and extends downwardly to lie between the inner face of the jaw 5 and the pin 10ª as will be observed from Figures 2 and 3. Also pivoted between the wings 30 is a tray 32 which normally gravitates into the position shown in Figure 2. If the slide is moved to the right in Figure 2, the tray, however, is adapted to ride over a stationary platform 33, which is carried by the casing and which, through its engagement with the bottom of the tray, will lift the tray into the horizontal position shown in Figure 3. The platform 33 is slotted to accommodate the rod 31.

The plate 29 is provided with an opening 34 adapted to be brought into registration with the opening 27 in order to allow the seed to fall through the registering openings 27 and 34 into the tray 32, while a second plate 35 has a turned down end 36 adapted to be received between the sides of the tray and which precludes the seeds from falling on through and out of the open end of the tray. The plate 35 is secured to the slide plate 29 by means of a screw 35ª which works through a slot in the plate 35 and threads into the plate 29. When this screw is loosened, the plate 35 may be shifted longitudinally in order to control the amount of seed that can be fed through the opening 34 into the tray and thus regulate the number of seeds delivered to the jaws at each operation. As shown in the drawings, the plates 29 and 35 project beyond the exterior of the casing and into a convenient position to permit of this adjustment.

In the normal position of the parts, as shown in Figure 2, the slide plate 29 is held by a spring 37 at a point where the openings 34 and 27 will be out of registration. If, however, the jaws are raised, the pin 10ª, sliding upwardly against the operating rod 31, will force the upper end of the rod backward against the tension of the spring 37 to pull the slide into a position wherein the opening 34 will register with the opening 27 and simultaneously move the tray in a horizontal position so that seed will fall through the registering openings and fill the tray as shown in Figure 3. If now, the jaws are permitted to lower, the spring 37 will act to move the slide to the left and in so doing will move the opening 34 out of registration with the opening 27 and simultaneously permit the tray to tilt and discharge the corn which it contains into the casing. Such corn will drop into the confines of the jaws to be in a position ready for planting.

A bristle brush 38 is preferably associated with the opening 27 to facilitate the feed of the seed and to preclude clogging or catching of the seed between the slides.

The operation of the parts in the planting of seed by the apparatus which I have described is as follows.

Having placed a quantity of seed in the hopper, the operator straps the apparatus to his leg and when he has arrived at the point which he is to start seeding, he makes a step. With the parts in the position shown in Figures 1 and 2, the weight of the body imparted through the stirrup to the casing is imposed directly upon the jaws which, while in a closed position, with the result that they are caused to enter the ground to a depth about equal to the distance which they project below the bottom end of the casing. At the conclusion of the step, the operator pulls on the cable 18 and as a result of the pulling of the cable, the latch functions to retract the stud and unlock the jaws, which are lifted by the cable so as to leave a hole into which the corn drops. The compound bell crank is simultaneously forced by the pull exerted through the links 21 against the surface of the ground with considerable power and causes the hole to be filled up through pressure of the bridge piece 24 upon the earth, thereby leaving the seeds covered and tamped.

While this operation has been taking place, the tray has been shifted into a position to receive another charge of seed.

At the conclusion of these operations, the operator releases the pull on the cable and takes another step. As soon as the leg to which the device is strapped is raised, the spring 25 urged the rods 21 downwardly and these rods in turn force the pin 10 downwardly thereby returning the jaws to their lower position, whereupon the stud 12 locks them in place for the next operation. The lowering of the jaws permits the compound bell crank lever to move into retracted position while the tray 36 simultaneously discharges another seeding of corn into the jaws, so that by the time the next step is taken and the device again dropped into engagement with the ground, the operations described may be repeated.

In practice, it has been found that a farmer may walk rapidly and seed at every second step, i. e., that is to say, at every step at which the apparatus engages the ground, planting takes place and after a very short time, the operator may become so proficient in the timing of the pulling of the cable that he does so without thinking and the operations of seeding progress with much greater rapidity than has heretofore been possible under any of the well known methods of hand seeding.

When it is desired that the operator be able to walk without seeding, the cable is pulled to unlock the jaws at the last seeding step and to raise the jaws to the uppermost position. The hook shaped link is thereupon manually disengaged from the trunnions 10 and the uppermost hook shaped portion 21$^a$ of each link manually engaged with a lug 1$^a$ at each side of the casing as shown best in Figure 1. When this has been done, the trunnions 10 will be disconnected from the spring 25 and the operator may hold the jaws in their uppermost position by means of the cable 18. All parts of the seeder will thus be raised, so that they will not engage with the ground as the operator walks. In this connection it may be stated that the jaws are held in upraised positions, so long as the manual pull is exerted on the cable and that they will drop as soon as the cable is released.

In the preferred form of apparatus shown in the drawings, the seed is illustrated as contained in a hopper mounted on the top of the casing 1, although, in practice, this hopper may be dispensed with and the seeds instead may be carried in a bag or knapsack hanging from the shoulders of the operator and communicated to the valve at the top of the casing by a hose, pipe or other suitable flexible conduit.

The foregoing detailed description sets forth the invention in its preferred practical form, but the invention is to be understood as fully commensurate with the appended claims.

Having thus fully described the invention, what I claim as new and desire to secure by Letters Patent is:

1. A seed planter embodying a casing, normally closed planting jaws pivoted to one another and in slidable telescoping relation with respect to the casing and normally projecting below the casing and into a position to be forced into the ground to form a hole, means for normally locking the jaws against movement with respect to the casing, and means, independent of movement of the casing for unlocking the jaws and thereupon retracting and simultaneously opening them to permit seed contained therein to be deposited in the hole thus formed.

2. A seed planter embodying a casing, a stirrup associated with the casing and adapted to be secured to the leg of an operator, pivoted jaws having telescoping relation to the casing normally projecting below the casing and adapted to be forced into the ground by the weight of the operator imposed on the stirrup, means for retracting and simultaneously opening the jaws to permit seed contained therein to be deposited in the hole thus formed, and means for filling said hole to cover the seed.

3. A seed planter embodying a casing, a stirrup associated with the casing and adapted to be secured to the leg of an operator, jaws pivoted to the casing and normally projecting below the casing and adapted to be forced into the ground by the weight of the operator imposed on the stirrup, means independent of movement of the casing for retracting and simultaneously opening the jaws to permit seed contained therein to be deposited in the hole thus formed, and means operable when the jaws are retracted from the hole, and after the seed is deposited therein, to fill the hole to cover the seed.

4. A seed planter embodying a casing, a pair of cooperating planting jaws pivoted to the casing and mounted for sliding movement relative thereto to be moved into projected position below the lower end of the casing or into raised position within the casing, operative connections between the jaws and the casing to pivotally move the jaws so that they are opened when they are raised and closed when they are lowered, said jaws collectively constituting a ground opening wedge when in closed, lowered position, means for depositing seeds within the confines of the jaws while they are closed, and manually operable means, actuated independently of movement of the casing, for retracting the jaws to open them and deposit the seed contained therein.

5. A seed planter embodying a casing, a pair of normally closed cooperating jaws mounted for pivotal movement on the casing and for sliding movement with respect thereto, means for imparting pivotal movement to the jaws when they are slidably moved with respect to the casing, said jaws collectively constituting a ground opening wedge when in closed position, means for depositing seed within the confines of the jaws while they are closed, means for normally locking the jaws in closed position, and manually controlled means, operable independent of movement of the casing, for unlocking the jaws and lifting them whereby they are opened to discharge the seeds therefrom.

6. A seed planter embodying a casing, pivoted jaws associated with the casing and longitudinally slidable with respect thereto, said jaws being adapted to extend below the casing and to be held fixed with respect thereto for insertion in the ground in closed position, means for introducing seed into the jaws while they are closed, means for unlocking the jaws from the casing and for moving them longitudinally of the casing, and means for opening the jaws upon longitudinal movement of the same for releasing the seed.

7. A seed planter embodying a casing, pivoted jaws associated with the casing and longitudinally slidable with respect thereto, said jaws being adapted to extend below the casing and to be held fixed with respect thereto for insertion in the ground in closed position, means for introducing seed into the jaws while they are closed, means for unlocking the jaws from the casing and for moving them longitudinally of the casing, means for opening the jaws upon longitudinal movement of the same for releasing the seed, and means for covering the seeds after they have been deposited.

8. A seed planter embodying a casing provided in its opposite sides with slots, with certain juxtaposed slots vertical and other juxtaposed slots deviating from the vertical, a pair of jaws, a pivot for pivotally securing the jaws to one another and which pivot extends through two juxtaposed vertical slots in the casing, trunnions also associated with the jaws and extending through the other slots in the casing, whereby vertical movement of the jaws with respect to the casing will effect an opening and closing of the jaws, means for normally locking the jaws in closed lowermost position to permit them to be thrust into earth, means for depositing seeds within the jaws, and manually operable means for unlocking the jaws and lifting them to effect a simultaneous opening of the jaws and a depositing of the seeds in the hole thus formed.

9. A seed planter embodying a casing provided in its opposite sides with slots, with certain juxtaposed slots vertical and other juxtaposed slots deviating from the vertical, a pair of jaws, a pivot for pivotally securing the jaws to one another and which pivot extends through two juxtaposed vertical slots in the casing, trunnions also associated with the jaws and extending through the other slots in the casing, whereby vertical movement of the jaws with respect to the casing will effect an opening and closing of the jaws, means for normally locking the jaws in closed lowermost position to permit them to be thrust into earth, means for depositing seeds within the jaws, manually operable means for unlocking the jaws and lifting them to effect a simultaneous opening of the jaws and a depositing of the seeds in the hole thus formed, and a pivoted member, pivoted to the casing and operatively connected to the jaws and adapted to be moved thereby into a position to fill the hole after the seeds have been deposited.

In testimony whereof I have signed the foregoing specification.

WILLIAM GOURLAY.